United States Patent [19]

Kuroyanagi et al.

[11] Patent Number: 5,004,406
[45] Date of Patent: Apr. 2, 1991

[54] RADIAL PISTON PUMP

[75] Inventors: Masatoshi Kuroyanagi, Kariya; Masahiko Suzuki, Hoi; Kazuma Matsui, Toyohashi; Makoto Imaeda, Okazaki; Kouzi Nagai, Anjo; Yoshiaki Ito, Chita, all of Japan

[73] Assignee: Nippondenso Co., Ltd., Kariya, Japan

[21] Appl. No.: 327,081

[22] Filed: Mar. 22, 1989

[30] Foreign Application Priority Data

Mar. 23, 1988 [JP] Japan .................................. 63-68683

[51] Int. Cl.$^5$ .............................................. F04B 1/10
[52] U.S. Cl. ..................................................... 417/273
[58] Field of Search .................... 417/273; 91/497, 498

[56] References Cited

U.S. PATENT DOCUMENTS 3,874,271  5/1975  Eickmann .
4,555,223 11/1985  Budecker et al. .
4,652,215  3/1987  Kuroyanagi et al. .
4,927,338  5/1990  Ito et al. ............................ 91/497 X

FOREIGN PATENT DOCUMENTS

1453691  5/1969  Fed. Rep. of Germany .
2059717  6/1972  Fed. Rep. of Germany .
2136016  7/1973  Fed. Rep. of Germany .
2507793 10/1975  Fed. Rep. of Germany .
3431158  3/1986  Fed. Rep. of Germany .
61-250387 11/1986 Japan .
2163493  2/1986  United Kingdom .

Primary Examiner—Gerald A. Michalsky
Attorney, Agent, or Firm—Cushman, Darby & Cushman

[57] ABSTRACT

A radial piston pump has a rotor provided within a cylinder chamber in such a manner that a center axis of the rotor is offset from a center axis of the cylinder chamber. The rotor has three working chambers a piston is slidably provided each of which. Each working chamber may connect with a suction groove or a discharge groove so that there exists a couple of situations, one of which is that two working chambers connect with the discharge chamber simultaneously and another one of which is that single working chamber connects with the discharge chamber. In order to make the forcing point at which total biassing force of the piston is focussed move gradually, the radial piston pump has a delay angle at a front side of the suction chamber. Namely a pressure within the working chamber is preliminary reduced before the working chamber connects to the suction groove so that the forcing point should shift gradually.

9 Claims, 11 Drawing Sheets

RADIAL PISTON PUMP

FIELD OF THE INVENTION

The present invention relates to a radial piston pump which is useful as an automotive brake fluid pump, for example.

BACKGROUND AND SUMMARY OF THE INVENTION

Figure 3:
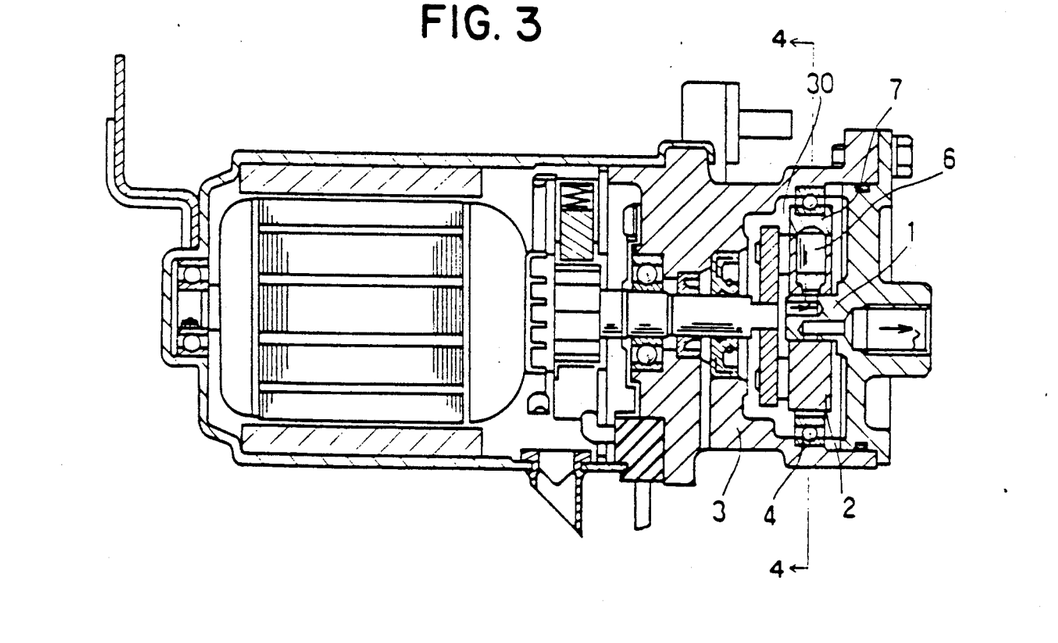
FIG. 3 is a sectional view of a pump relating to a present invention.

The present inventors had made a radial piston pump as shown in FIG. 3, the radial piston pump has a rotor 2 rotatably provided on a pintle portion 1, and the pintle portion 1 is provided within a cylinder portion 30 formed within a housing 3. A bearing 4 is provided between the inner surface of the housing and the outer surface of the rotor 2. A piston 6 is slidably provided within a working chamber formed in the rotor 2, so that the piston 6 is rotated simultaneously with the inner race of the bearing 4. Since the center portion of the rotor 2 is offset from the center portion of the cylinder portion 30, the piston 6 is reciprocated within the working chamber 8 while the rotor 2 is rotated, so that the oil is introduced into the working chamber from a suction groove 9 and discharged from the working chamber 8 to a discharge groove 10 in accordance with the reciprocation of the piston.

Figure 5:
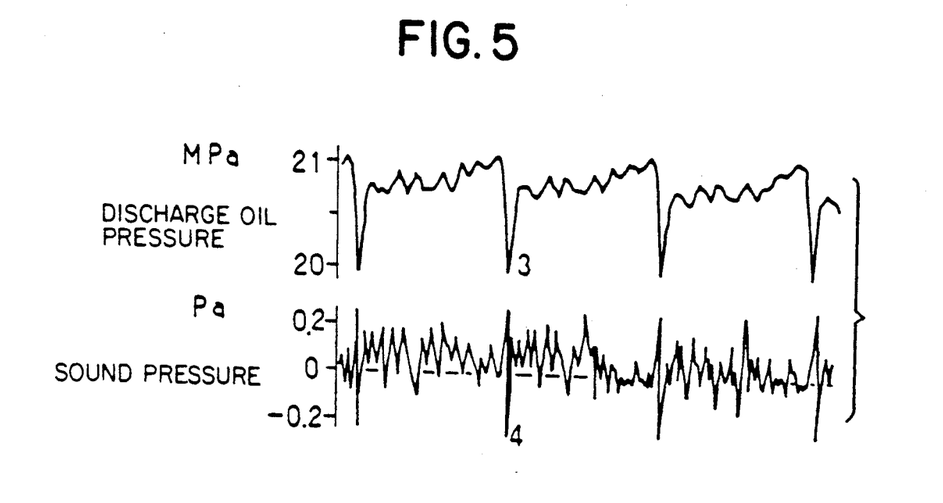
FIG. 5 shows a pattern of the discharge oil pressure and the sound pressure caused by the pump shown in FIG. 3.

It is eagerly required to reduce the noise generated by the radial piston pump, especially when the pump is mounted on an automobile. In order to reduce the noise generated by the pump, the present inventors had studied about the relationship between the discharge pressure and the noise sound pressure of the pump. As shown from FIG. 5, the sound pressure has peaks at times that coincide with the peaks of the discharge oil pressure. Accordingly, the peak of the sound pressure occurs when the discharge oil pressure reaches its maximum.

Figure 6:
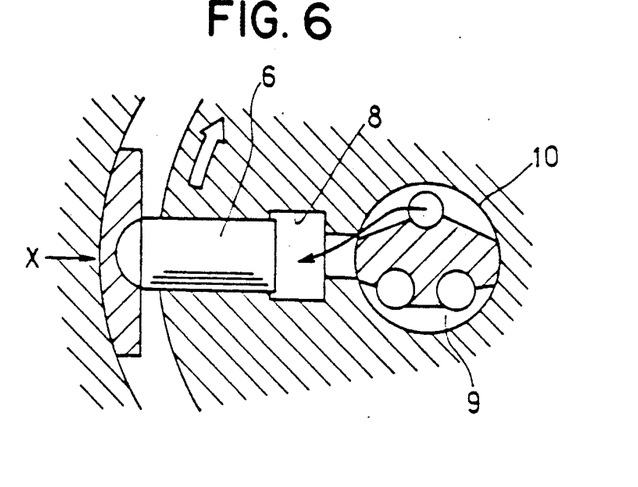
FIG. 6 is an enlarged sectional view showing a pump chamber of a pump shown in FIG. 3.

It is the present inventor's opinion that the highly pressurized oil within the discharge groove 10 flushes back toward the working chamber 8 when the front edge of the working chamber 8 contacts the discharge groove 10 as shown in FIG. 6, and the back flow of the oil makes the noise sound pressure.

Figure 7:
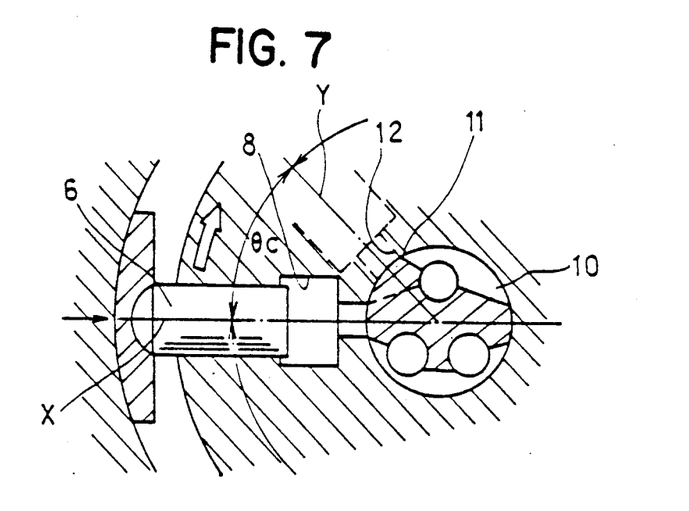
FIG. 7 is an enlarged sectional view explaining a delay angle Θc.
Figure 8:
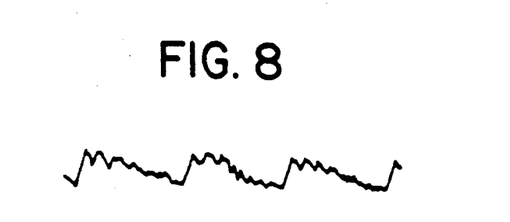
FIG. 8 shows a pattern of the discharge oil pressure caused by a pump shown in FIG. 7.

In order to cease the back flow, the present inventors had made the pump the front edge 11 of that had a discharge groove 10 of which is withdrawn as shown in FIG. 7. Namely, the pump shown in FIG. 7 has a delay angle $\Theta c$ between a bottom dead point X at which the protruding amount of the piston from the rotor 2 becomes maximum and a connecting point Y at which the front edge 12 of the working chamber 8 contacts with the edge 11 of the discharge groove 10. Since the oil within the working chamber 8 is preliminary pressurized during the delay angle $\Theta c$, the oil pressure within the working chamber 8 becomes as high as that within the discharge groove, to present the oil within the discharge groove flushing back to the working chamber 8. FIG. 8 shows the pattern of the discharge pressure of the pump shown in FIG. 7. As clearly shown from FIGS. 5 and 8, the vibration of the discharge pressure can be reduced when the pump has the delay angle $\Theta c$.

Figure 4:
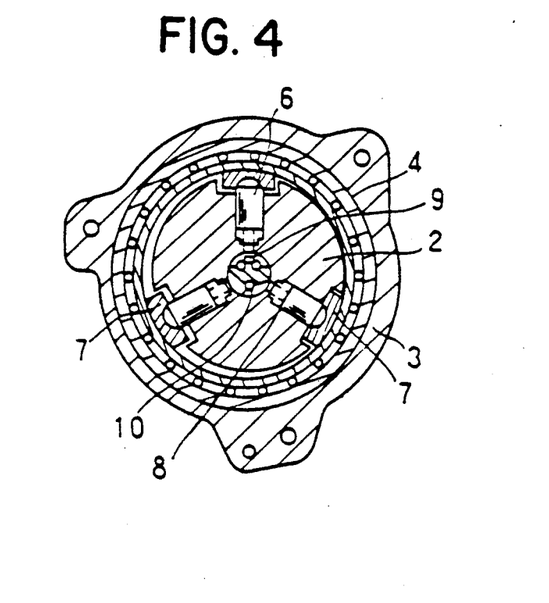
FIG. 4 is a sectional view of a pump taken along with IV—IV line of FIG. 3.

The noise sound pressure of the pump having the delay angle, however, can not be reduced as much as the discharge pressure, so that the total noise generated by the pump having the structure such as shown in FIG. 7 can not reduce the generation of the noise effectively. The present inventors, therefore, have further studied the mechanism of the noise production. As shown in FIG. 4, the piston 6 and the shoe 7 of radial piston pump rotate simultaneously with the inner race of the bearing 4 when the rotor 2 is rotated, in other words, the relative movement between the piston 6 and shoe 7 and also between the shoe 7 and the inner race of the bearing does not occur even while the rotor 2 is rotated. Accordingly, it is very hard for the oil to be introduced between the shoe 7 and the inner race of the bearing.

If the bearing 7 slides along with the inner surface of the bearing 4, the oil may be introduced between the inner race of the bearing 4 and the shoe 7, so that the oil held between the inner race and the shoe can interrupt the transmittal of the vibration from the piston 6 to the housing 3.

On the other hand, since the shoe 7 of the radial piston pump rotates simultaneously with the inner race of the bearing as described before, no oil can exist between the shoe 7 and the bearing 4. Therefore, the vibration of the piston can be transmitted to the bearing 4 through the shoe 7, so that the vibration of the piston 6 is directly transmitted to the housing 3.

Figure 9:
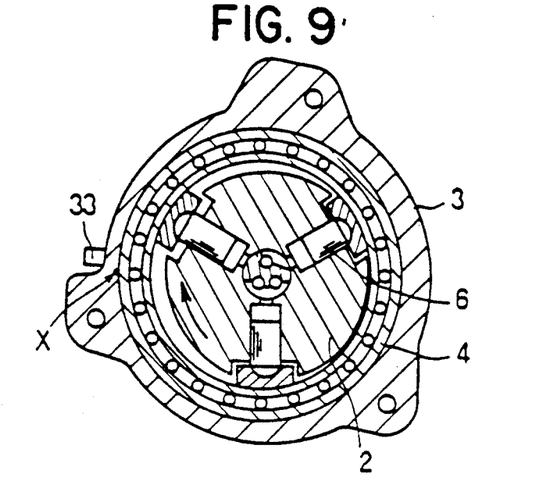
FIG. 9 is a sectional view of a pump on which an accelerating sensor is mounted.
Figure 10:
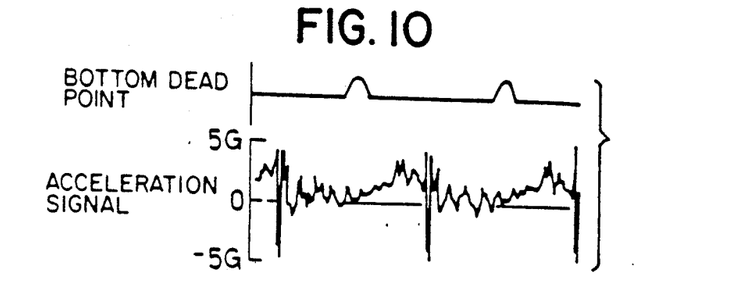
FIG. 10 shows a pattern of acceleration signal caused by a pump shown in FIG. 9, FIGS. 11 and 12 are sectional views of a pump explaining a forcing point K.

The present inventors have determined that the vibration of the piston 6 is the primary noise source of the radial piston pump having the bearing 4 between the piston 6 and the housing 3. The present inventors had studied about the relationship between the vibration of the housing 3 and the rotation of the rotor 2. In order to detect the vibration of the housing 3, an acceleration sensor 33 is attached on the housing as shown in FIG. 9. FIG. 10 shows the acceleration signal detected by the acceleration sensor 33. As shown from FIG. 10, the maximum point of the vibration of the housing 3 is not occurred at the bottom dead point of the piston 6 but occurred at the top dead point of the piston 6, the bottom dead point of the piston 6 is identical with the position X shown in FIG. 7, and the top dead point of the piston 6 is identical with the position that the retreating amount of the piston 6 into the working chamber 8 becomes maximum.

Figure 11:
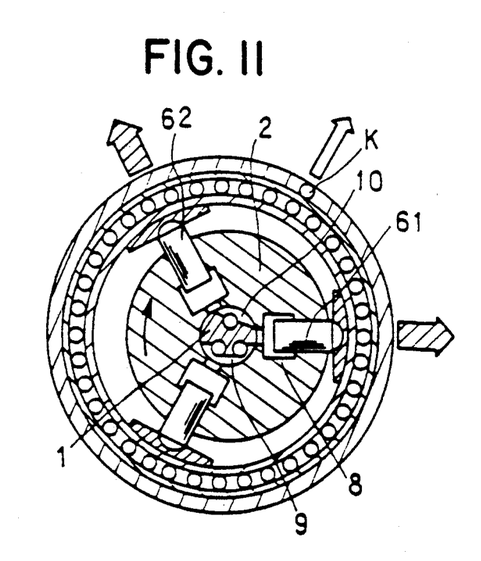
Figure 12:
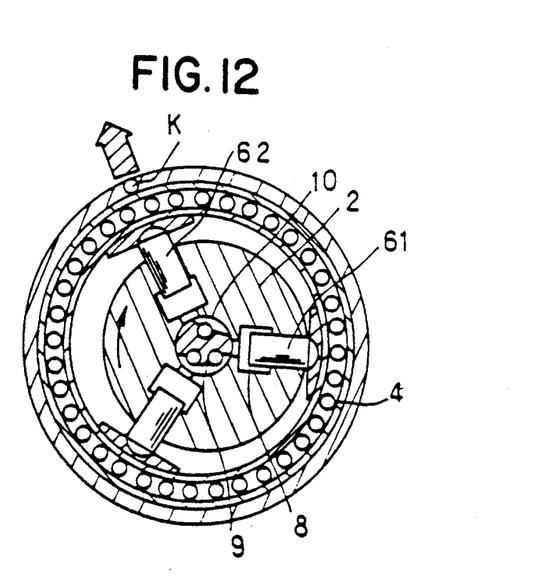
Figure 13:
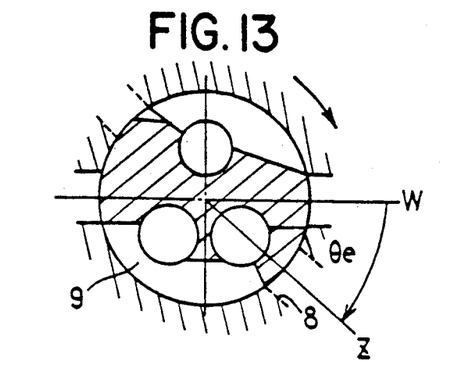
FIG. 13 is a sectional view of a pump which has a delay angle Θe, FIG. 14 explains a relationship between rotating angle Θ and a pressure within a working chamber.

The present inventors had then studied about the vibration source of the housing 3. Since the radial piston pump shown in FIG. 4 has three pistons and since there are only two pressure conditions e.g. the discharge pressure condition and the suction pressure condition while the rotor rotates, there should be exist two types of pressure balances. One is that two of three pistons 6 receive the discharge pressure and the remaining piston receives the suction pressure. Another is that one of three pistons receives the discharge pressure and remaining two pistons receive the suction pressure. FIG. 11 shows the former condition where the pistons 61 and 62 receive the discharge pressure so that the resultant of the two forces are occurred at the point K which locates between the pistons 61 and 62. FIG. 12 shows the latter condition that only one piston 62 receives the discharge pressure, so that the force point K is identical with the position of the piston 62. Since the condition shown in FIG. 12 occurs immediately after the rotor 2 rotates from the condition shown in FIG. 11, the force point K shifts quickly and this makes the housing 3 vibrate. It is, therefore, the present inventors opinion that the vibration of the housing 3 should be reduced if the force point K where shift slowly from the point shown in FIG. 11 to the point shown in FIG. 12. In order to attain the slow shift of the force point K, the present inventors have provided a radial piston pump having a front edge of the working chamber 8 which does not contact with the suction groove 9 at the first point W which is identical with the top dead portion of the piston 61 but is contacted with the suction groove at the second position Z as shown in FIG. 13. Accordingly, the oil pressure within the working chamber 8 is preliminary reduced during a delay angle Θe between the first position W and the second position Z.

In order to determine the amount of the delay angle Θe, the present inventors calculated the angle Θe by using the following formula (1).

$$H(\Theta e) = \epsilon(1 - \cos \Theta e) + (R - r)(1 - \cos Y) \quad -(1)$$

The varying rate P1 of the pressure within the working chamber 8 is calculated by using the formula (2).

$$Pi' = \frac{E(Hi'(\Theta e)A - Qi)}{Vi - Hi(\Theta e)A} \quad (2)$$

The introducing amount of the oil into the working chamber is calculated by using the formula (3).

$$Qi' = cAi(\Theta e) \times \sqrt{\frac{2(Pi - PO)}{\rho}}$$

$$(Pi > PO)$$

$$Qi = cAi(\Theta e) \times \sqrt{\frac{2(PO - Pi)}{\rho}} \quad (3)$$

$$(PO > Pi)$$

The varying rate of the pressure of oil the within the working chamber during the delay angle Θe is calculated by using the formula (4).

$$PO' = \frac{E(\Sigma Qi - Qt)}{VO} \quad (4)$$

The amount of the oil introducing into the working chamber 8 is calculated by using the formula (5).

$$Qt = AO \times \sqrt{\frac{2(Ps - PO)}{\zeta \cdot \rho}} \quad (5)$$

In these formulas (1)–(5), $\epsilon$ represents the offset amount, Y represents the rotating angle, R represents the inner diameter of the bearing, E represents the elastic coefficient of the oil, r represents the radius at the top portion of the piston, c represents flow coefficient, $\rho$ represents the density, $\zeta$ represents the coefficient of the pressure drove.

Figure 14:
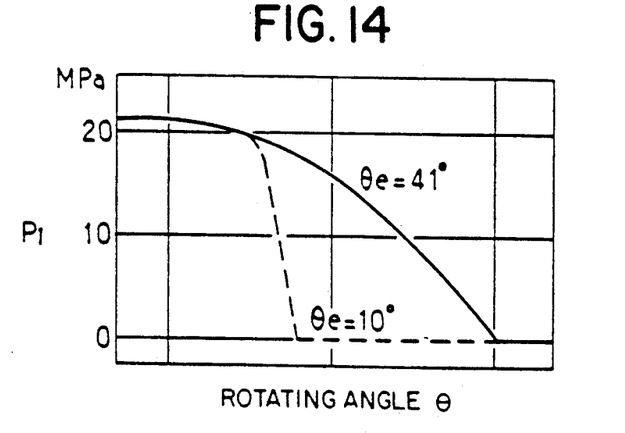
Figure 15:
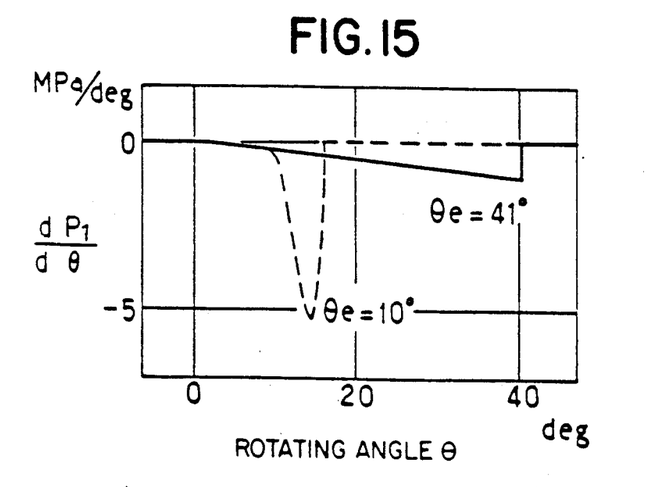
FIG. 15 shows a relationship between a rotating angle Θ and a varying rate of pressure in the working chamber of a pump shown in FIG. 13, FIG. 16 explains a relationship between a delay angle Θe and a varying rate of a pressure within the working chamber, FIG. 17 explains a movement of a forcing point K.
Figure 16:
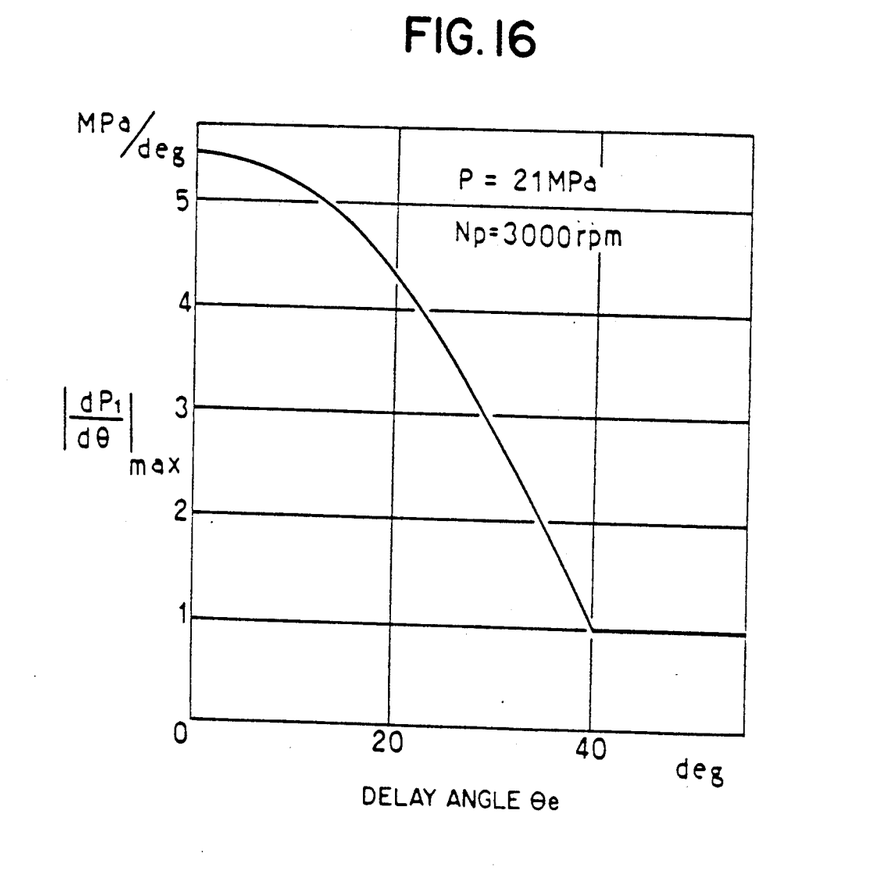

FIG. 14 shows the relationship between the delay angle Θe and the pressure P1 within the chamber, the relationship being obtained by using the above mentioned formulas (1)–(5). As shown from FIG. 14, the pressure within the chamber 8 is gradually decreased when the delay angle Θe becomes 41°, and the pressure P1 within the chamber 8 drops sharply when the delay angle Θe becomes 10°. FIG. 15 shows the relationship between the rotating angle Θ and the pressure varying rate within the working chamber 8. As shown from FIG. 15, the varying rate of the pressure within the chamber 8 can be small when the delay angle Θe becomes 41°. As described above, the varying rate of pressure within the chamber is strongly dependant on the delay angle Θe. FIG. 16. shows the influence of the delay angle Θe. The ordinate of FIG. 16 is the delay angle Θe and coordinate of FIG. 16 is the maximum varying rate of the pressure when the delay angle Θe is fixed as the value indicated by the ordinate. As shown from FIG. 16, the varying rate of pressure becomes minimize when the delay angle Θe becomes 40°.

Figure 17:
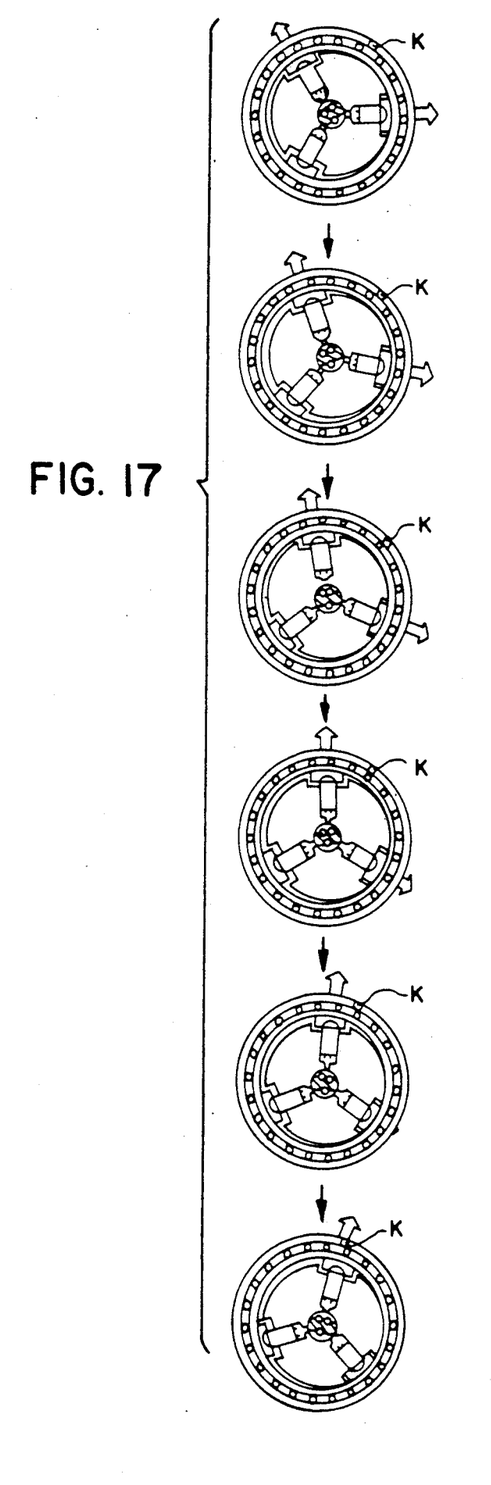
Figure 18:
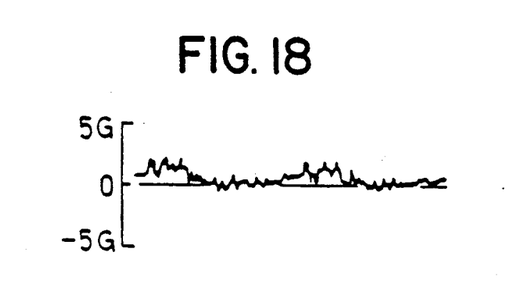
Figure 19:
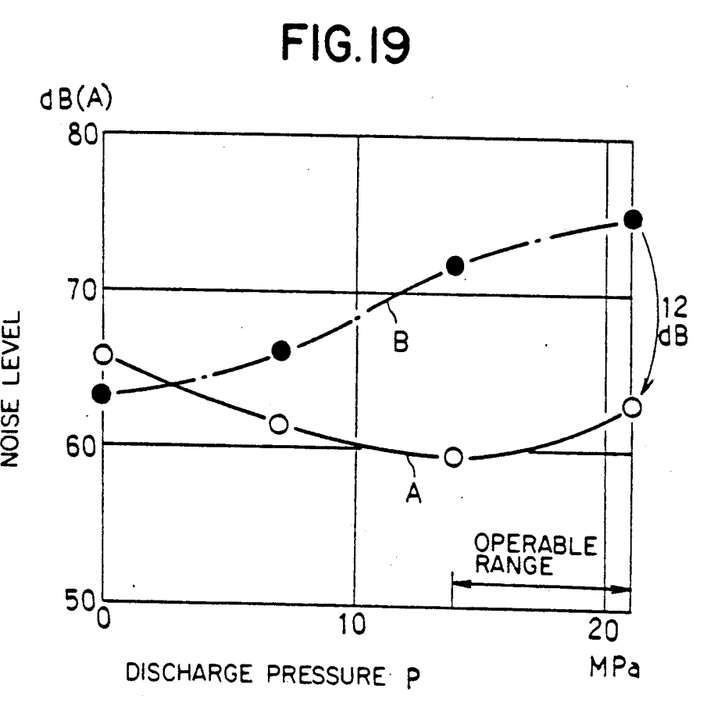

FIG. 17 shows the movement of the forcing point K at which the pressing force caused by the pistons is focused when the delay angle Θe is 41°. As shown from FIG. 17, the forcing point K is varied in accordance with the rotation of the rotor 2, and the movement of the forcing point K is very gradually. FIG. 18 shows the vibration of the housing of the radial piston pump the delay angle Θe of which is 41°. It is understood that radial piston pump having the delay angle Θe of 41° can reduce the vibration thereof. FIG. 19 shows the level of the radial piston pump which has the same features as that shown in FIGS. 10 and 18. The solid line A indicates the noise level of the radial piston pump having the delay angle Θe of 41°, the dotted line B indicates the noise level of the radial piston pump having no delay angle Θe. The noise level of the radial piston pump having the delay angle Θe of 41° can be reduced.

Figure 20:
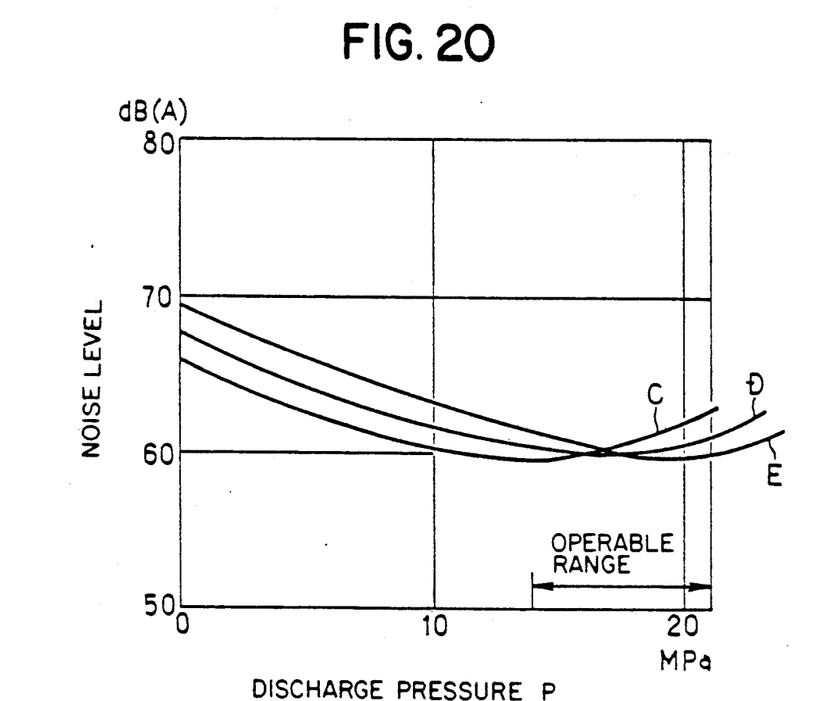

It should be also noticed that the noise level of the pump when the discharge pressure 21 MPa is higher than that when the discharge pressure is 14 MPa. Since the delay angle Θe of 41° is obtained from the calculation by using the formulas (1)–(5), for the purpose of reducing the noise level when the discharge pressure is 21 MPa, the actual data obtained from the test pieces is slightly different from that calculated value by the formulas. It is the present inventors opinion that the difference between the actual data and the calculated value is caused by the oil leakage that occurs around the piston. In order to reduce the noise level of the pump, the present inventors made several test pieces the delay angle Θe of which are different from each other. The solid line C of FIG. 20 indicates the noise level of the pump the delay angle of which is 43°, the solid line D of FIG. 20 also indicates the noise level of the pump the delay angle Θe of which is 53°, the solid line E of FIG. 20 indicates the noise level of the pump the delay angle Θe of which is 63°. As shown from FIG. 20, the noise level of the pumps having the delay angle larger than 43° are not different from each other. The minimum point of the noise level, on the other hand, is valid in accordance with the delay angle Θe.

Figure 21:
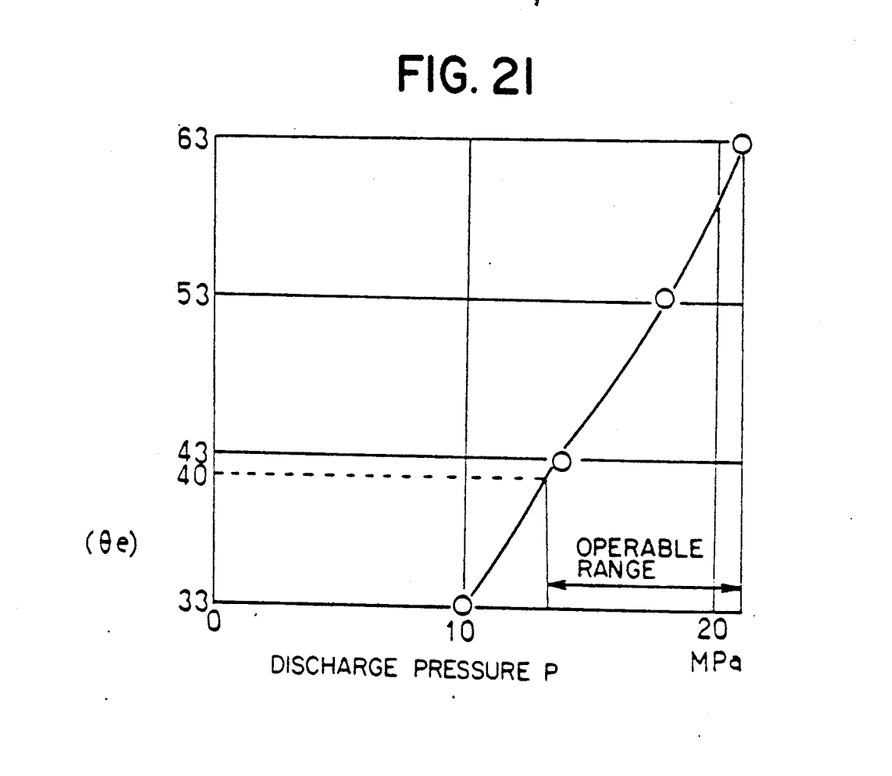

The present inventors had then studied about the relationship between the delay angle Θe and the discharge pressure at which the noise level becomes minimize. The discharge pressure making the noise level minimize is strongly depend on the increment of the delay angle Θe as shown in FIG. 21. Since the operable range of the pump is the range between 14 MPa and 21 MPa, the delay angle Θe should be in the range of 43°–63°. Since the pump efficiency should be decreased when the delay angle Θe becomes too large, the delay angle Θe of less than 60° is preferable.

The present inventors have completed the present invention after studying about the noise generated by the pump. The present invention, therefore, has the object to reduce the noise level of the pump.

In order to attain the object, the radial piston pump of the present invention employs such features that the front edge of the working chamber begins to contact with the suction groove after the rotor is rotated by the predetermined delay angle Θe from a first position at which the piston locate the top dead point thereof. The delay angle Θe during which the pressure within the working chamber is reduced is practical when the angle is more than 40°. It is well prevented that the forcing point caused by the piston is moved quickly, so that the vibration of the housing is also well prevented.

BRIEF DESCRIPTION OF THE DRAWINGS

FIG. 18 shows a pattern of a vibration of a housing of the pump shown in FIG. 13, FIG. 19 explains a relationship between a discharge pressure and a noise level of pumps shown in FIGS. 13 and 9, FIG. 20 explains an influence of a delay angle relating to a noise level, FIG. 21 explains a relationship between a discharge pressure and a delay angle Θe.

DETAIL DESCRIPTION OF THE PREFERRED EMBODIMENT

A preferred embodiment of a pump of the present invention is explained hereinafter by referring to the drawings.

Figure 1:
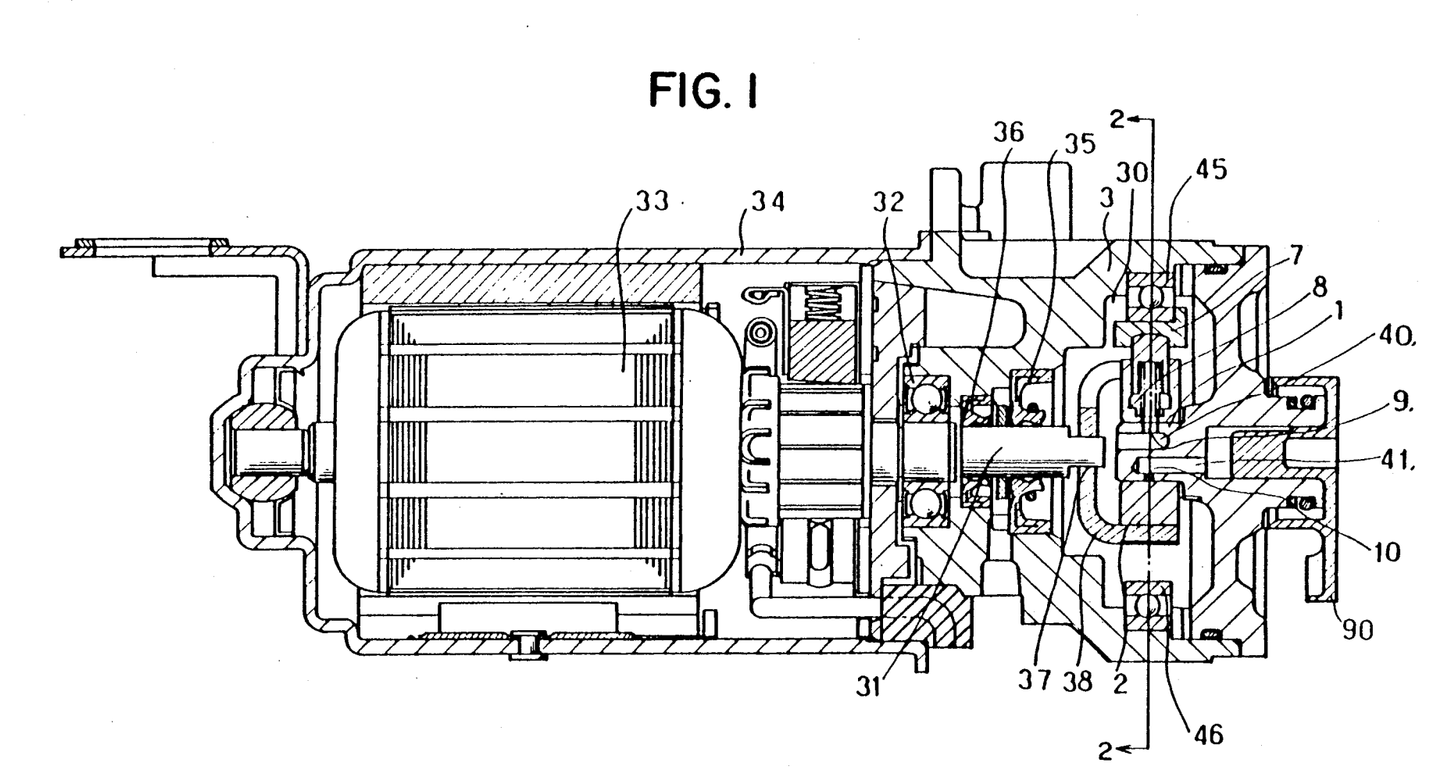
FIG. 1 is a sectional view of a pump relating to the present invention.
Figure 2:
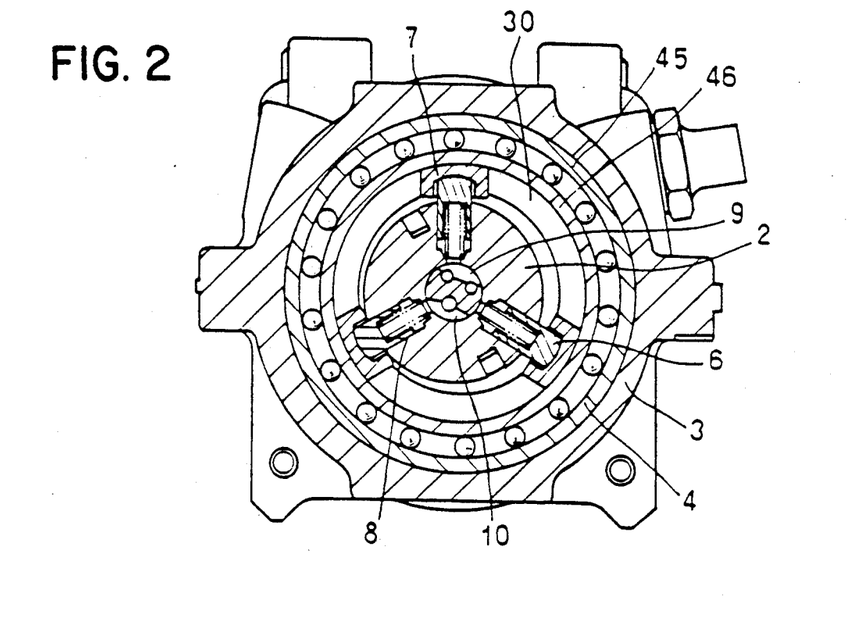
FIG. 2 is a sectional view taken along with II—II line of FIG. 1.

Numeral 3 indicates a housing in which a cylindrical cylinder chamber 30 is formed. A pintle portion 1 is provided within a cylinder chamber 30 in such a manner that a central axis of the pintle portion 1 is offset from that of the cylinder chamber 30. A rotor 2 is rotatably mounted on the pintle portion 1. A shaft 31 is provided within the housing 3 in such a manner that the central axis of the pintle portion is coaxial with that of the shaft 31. The shaft 31 is rotatably supported by a bearing 32, and the shaft 31 is formed integrally with a shaft of a motor 33. The motor 33 is supported within a motor housing 34, and the motor housing 34 is fixed to the housing 3. Sealing means 35 and 36 by which the oil within the cylinder chamber 30 is well prevented from leaking along with the shaft 31 are provided within the housing 3, so that the motor 33 is well protected from the oil.

A coupling portion 37 is formed at the end portion of the shaft 31 and a coupling 38 by which the rotation of the shaft 31 is transmitted to the rotor 2 is connected at the coupling portion 37. A suction port 40 which faces to the cylinder chamber 30 is formed within the pintle portion 1, and the suction port 40 is connected to a suction groove 9 which is formed at the outer surface of the pintle portion 1. A discharge port 41 is also formed within the pintle portion 1 and the discharge port 41 is connected to a discharge groove which is formed at the outer surface of the pintle portion 1. The discharge groove 10 is formed at the opposite side of the suction groove 9. The discharge port 41 is connected to an automotive brake system through a hose (not shown), the discharge port 41 of the pump shown in FIG. 1 is sealed by a cap 90, the cap 90 is detached when the pump is connected to the hose (not shown).

Figure 22:
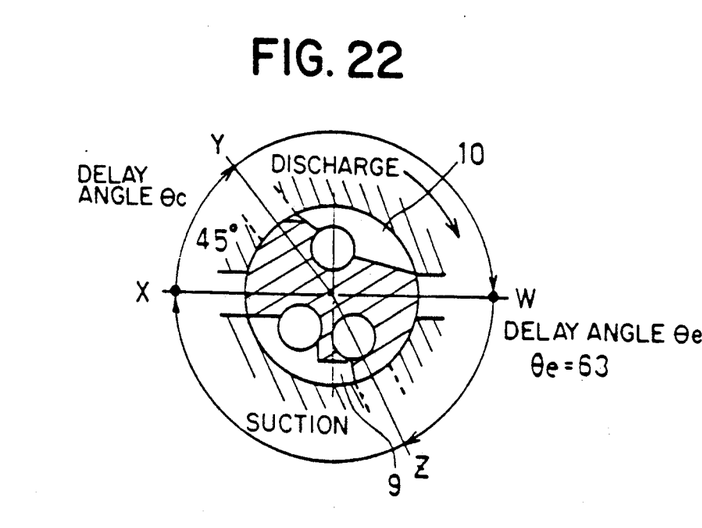
FIG. 22 is a sectional view of a pump showing a discharge groove and a suction groove.

An outer race 45 of a bearing 4 is held by the inner surface of the cylinder chamber 30. An inner race 46 of the bearing 4 is attached to a shoe 7. As shown from FIG. 22, a delay angle Θe is formed on the suction groove 9 from a first position W at which the piston becomes the top dead point thereof and a second portion Z at which the front edge of the working chamber 8 begins to connect to the suction groove 9. The delay angle Θc is formed between the third portion X at which the piston 6 locates at the bottom dead point thereof and the fourth portion Y at which the front edge of the working chamber 8 begins to connect to the discharge groove 10.

The operation of the above described pump is explained hereinafter. The rotor 2 starts to rotate within the cylinder chamber 30 when the rotation of the motor 33 is transmitted to the rotor 2 through the shaft 31 and the coupling 38. Since the central axis of the rotor 2 is offset from that of the cylinder chamber 30, the piston 6 reciprocates within the working chamber while the rotor is rotated. The oil within the suction groove 9 is sucked toward the working chamber 8 during the suction stroke when the piston 6 protrudes from the working chamber. The pressurized oil within the working chamber is discharged toward the discharge groove 10 during the discharge stroke when the piston 6 moves down to the working chamber. The pressurized oil discharged toward the discharge groove 10 is, then, supplied toward the automotive brake system.

Since the pump of the present embodiment has the delay angle Θe, the oil pressure within the working chamber is not varied sharply but is varied smoothly when the working chamber contacts with the suction groove 9. The pump of the present invention also has the delay angle Θc at the front edge of the discharge groove 10, so that the oil pressure within the working chamber is not varied sharply but varied smoothly when the working chamber contact with the discharge groove 10. Accordingly, the pump of the present embodiment can work silently.

What is claimed is:

1. A radial piston pump comprising;
    a housing in which a cylindrical cylinder chamber is formed,
    a rotor rotatably provided within said cylinder chamber in such a manner that a center axis of said rotor is offset from a center axis of said cylinder chamber, said rotor having a working chamber formed therein,
    a piston reciprocably provided within said working chamber formed within said rotor,
    a bearing provided within said cylinder chamber, an outer race of said bearing being supported by said housing nd an inner face of said bearing being functionally connected with said piston,
a pintle portion provided at the center axis portion of said rotor so that said rotor is rotatably supported by said pintle portion,
a suction groove formed at an outer surface of said pintle portion so that said working chamber will face to said suction groove at certain positions of said rotor, and
a discharge groove formed on an outer surface of said pintle portion so that said working chamber will face to said discharge groove at certain positions of said rotor,
said pintle portion including means for forming a first delay angle at a front side of said suction groove, said first delay angle being more than 40° between a first portion, at which said piston is at a bottom dead point within said working chamber, and a second portion, at which a front edge of said working chamber contacts with said suction groove so that a forcing point at which a pressing force caused by said piston is focused is gradually moved in accordance with a rotation of said rotor.

2. A radial suction pump according to claim 1, wherein said pintle portion has a second delay angle formed at a starting end side of said discharge groove between a third position at which said piston locates at a top dead point within said working chamber and a fourth portion when a front edge of the working chamber begins to connect with said discharge groove.

3. A radial piston pump according to claim 1, wherein said rotor has three working chambers equiangularly spaced apart from each other.

4. A radial piston pump according to claim 1, wherein said first delay angle between said first position and said second position is more than 50°.

5. A radial piston pump claimed in claim 1, further comprising:
a shoe provided between a top end portion of said piston and an inner surface of said inner race of said bearing.

6. A radial piston pump comprising,
a housing in which a cylindrical cylinder chamber is formed,
a pintle portion provided within said cylinder chamber in such a manner that the center axis of said pintle portion is offset from a center axis of said cylinder chamber,
a rotor rotatably mounted on said pintle portion, said rotor having three working chambers therein such a manner that intervals between each adjacent pair of said working chambers are equal to each other,
a rotor slidably provided within said working chambers, and
a bearing provided within said cylinder chamber in such a manner that an outer race of said bearing is held by said housing and an inner race of said bearing is functionally connected with said piston, wherein
said pintle portion has a discharge groove and a suction groove at an outer surface of said pintle portion, and said pintle portion has a preliminary expanding portion at a front edge side of said suction groove formed such that a pressure within said working chamber is gradually reduced before said working chamber connects to said suction groove, and so that a forcing point at which a pressing force caused by said pistons is focused is moved gradually.

7. A radial piston pump comprising,
a housing in which a cylindrical cylinder chamber is formed,
a pintle portion provided within said cylinder chamber in such a manner that a center axis of said pintle portion is offset from a center axis of said cylinder chamber,
a rotor rotatably provided on said pintle portion, said rotor having three working chambers therein in such a manner that intervals between adjacent ones of said working chambers is equal to each other,
a piston slidably provided within each said working chamber so that a top end of said piston is functionally connected with an inner surface of said cylinder chamber so that said piston reciprocates within said working chamber,
a suction groove formed on an outer surface of said pintle portion in such a manner that said working chamber will face to said suction groove at certain orientations and,
a discharge groove formed on an outer surface of said pintle portion at an opposite side of said suction groove in such a manner that said working chamber will face to said discharge groove at certain orientations, wherein
said pintle portion includes means for forming a first delay angle at a front edge side of said suction groove such that a pressure within said working chamber is preliminarily reduced before said working chamber connects with said discharge groove, and
said pintle portion includes means for forming a second delay angle at a front edge side of said suction groove such that a pressure within said working chamber is preliminarily reduced before said working chamber connects with said suction groove so that a forcing point at which a pressing force caused by said pistons is focused is gradually moved in accordance with a rotation of said rotor.

8. A radial piston pump for pumping fluid comprising:
a housing in which a cylinder chamber is formed,
a rotor rotatably provided within said cylinder chamber said rotor having a working chamber formed therein,
a pintle portion within said cylinder chamber which has a discharge groove on its outer surface,
a piston reciprocably provided within said working chamber,
suction means, for sucking said fluid, formed to face said working chamber at certain positions of said rotor,
discharge means for discharging said fluid, formed to face said pintle portion so that said working chamber will face said discharge groove at certain positions of said rotor,
means for forming a first delay angle at a front side of said suction means, said first delay angle being between a first portion, at which said piston is at a bottom dead point within said working chamber, and a second portion, at which a front edge of said working chamber contacts said suction means, said first delay angle being an amount that a forcing point at which a pressing force caused by said piston is focused is gradually moved.

9. A pump as in claim 8, wherein said first delay angle is more than 40°.

* * * * *